Sept. 23, 1941.   J. A. GIBBONS   2,256,556
SUPPORT
Filed April 15, 1939   2 Sheets-Sheet 1

INVENTOR.
JAMES A. GIBBONS
BY W E Beatty
ATTORNEY.

Sept. 23, 1941.     J. A. GIBBONS     2,256,556
SUPPORT
Filed April 15, 1939     2 Sheets-Sheet 2
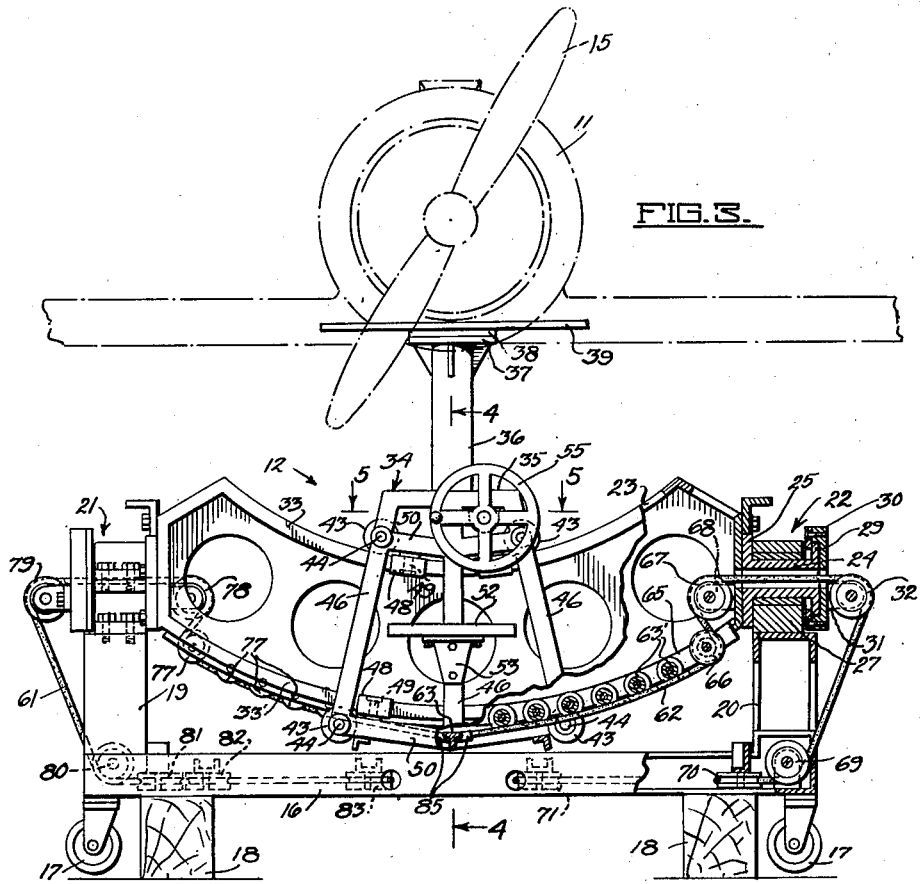
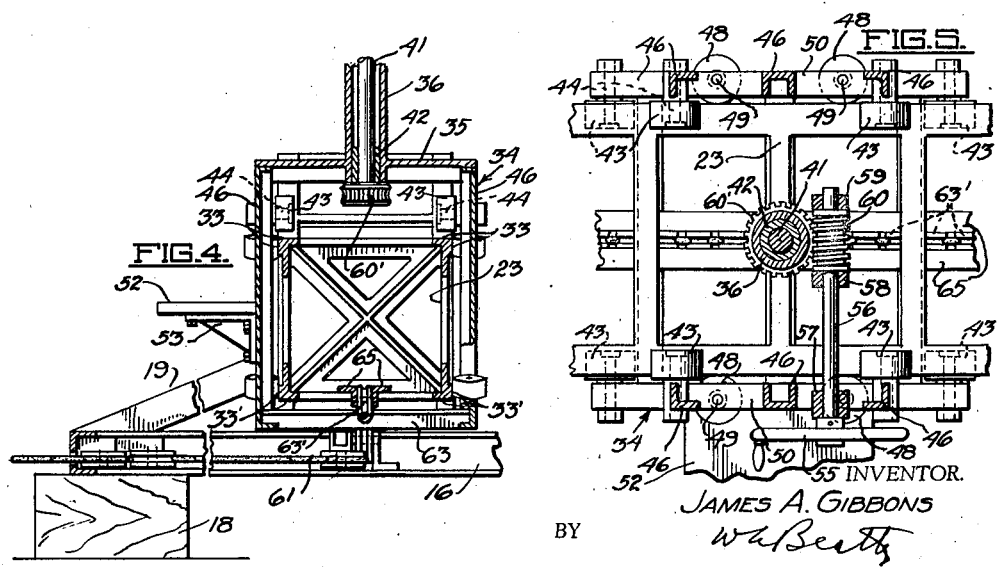
INVENTOR.
JAMES A. GIBBONS
BY
ATTORNEY.

Patented Sept. 23, 1941

2,256,556

UNITED STATES PATENT OFFICE 2,256,556

SUPPORT

James A. Gibbons, North Hollywood, Calif., assignor to Warner Bros. Pictures, Inc., New York, N. Y., a corporation of Delaware Application April 15, 1939, Serial No. 268,147

13 Claims. (Cl. 248—127)

This invention relates to means for supporting objects for movement in different directions and is especially directed toward the support of objects to be moved about a plurality of different axes to simulate a natural movement of the object for photographic purposes.

The invention is particularly applicable to the production of composite motion pictures such as the type wherein a previously photographed background scene is projected upon a screen in back of an object constituting the foreground component and generally including actors. The combined foreground object and projected background picture are photographed by a motion picture camera to obtain a motion picture film which, when subsequently processed and projected in the usual manner, appears to have had the actual foreground and background components simultaneously photographed thereon from the same point of view. However, the invention is also applicable to production of other types of composite cinematography or ordinary cinematography.

In making picture of the above type, the foreground object must generally be moved during photographing in such a manner as to simulate the natural movement thereof and must also be moved in such a manner as to harmoniously correspond with the background component thereof. For example, in producing a composite picture wherein the foreground object comprises an airplane having an actor therein, the airplane must be tilted, banked and/or turned in a natural manner and must be also moved in a manner to blend in with the projected background picture which, for example, may be a previously photographed picture of clouds and/or a distant landscape.

Heretofore, banking, tilting, etc., of such a foreground object was generally accomplished by suspending the object, in miniature or full size, by wires attached at different points along the object and by raising and lowering one or more of the wires so as to cause the desired movement of the object. This method requires a considerable amount of practice and skill to correctly manipulate the wires to cause an airplane to move about the corresponding axes about which it would move in actual flight. Furthermore, these wires often interfere with the portions of the object or other parts of the scene being photographed.

Another method heretofore employed in moving an airplane to simulate actual flight conditions was to support the airplane upon a universal joint such as a ball and socket arrangement and to tilt and turn the airplane about this joint while being cinematographed. However, by this method the aircraft was moved about axes which were entirely removed from the airplane and thus gave an unnatural movement thereto.

The object of the present invention is to obviate the above mentioned difficulties heretofore experienced in movably supporting airplanes or other objects to simulate actual flight conditions or movement.

Another object of the invention is to support, from a single pedestal, an object to be moved about a plurality of axes passing through the object.

The manner in which the above and other objects of the invention are accomplished will be readily understood on reference to the following specification taken in conjunction with the accompanying drawings wherein:

Fig. 3 is a front view, with parts in section, of the support.

Fig. 4 is a transverse sectional view through the bridge member and carriage movable therealong, and is taken along the line 4—4 of Fig. 3.

Fig. 5 is a sectional plan view through the carriage and is taken along the line 5—5 of Fig. 3.

Figure 1:
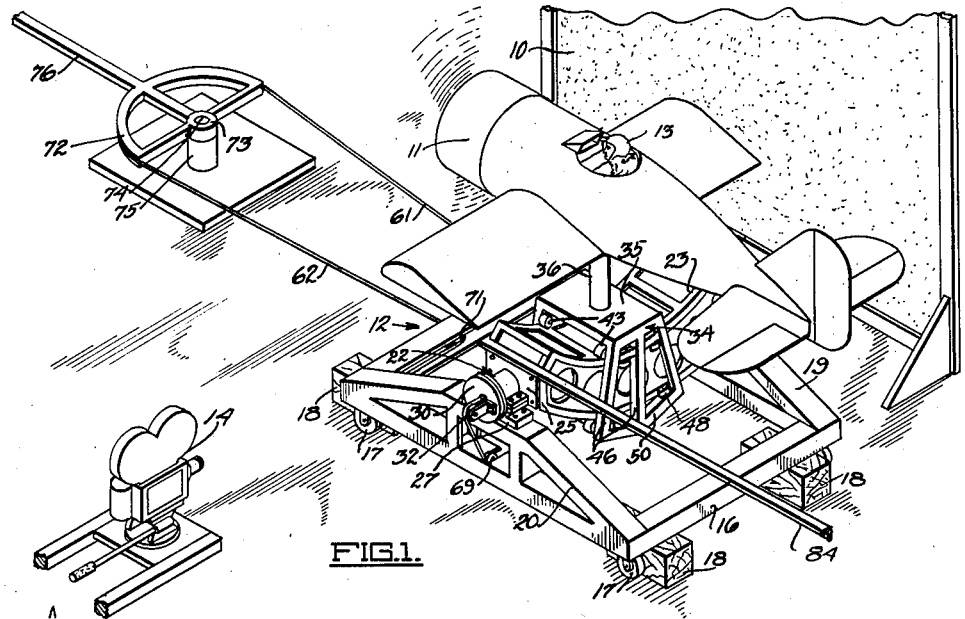
Fig. 1 is a perspective view of an arrangement for producing a composite motion picture and embodying the present invention.

The first step in producing a composite motion picture of the background projection type comprises producing a background key shot of the locality or scene in which the foreground object (the airplane) is to be ultimately depicted. In the case of a traveling shot, that is, where the airplane is to be ultimately depicted as moving past a certain locality or scene, a key shot is photographed of that locality or scene from an actual airplane flying therepast. The film thus obtained is processed and thereafter projected upon a picture screen as at 10 (Fig. 1). Preferably, this screen is of the translucent type, in which case, the background scene is projected on the rear thereof.

A full size model airplane 11 is positioned in front of the screen 10 and is movably supported on a universal support generally indicated at 12. An actor 13 is positioned in the cockpit of the model 11. The various moving parts, such as the rudder 21 and elevator 22, may be moved by the actor 13 to simulate actual flight conditions.

A motion picture camera 14 is suitably supported at the side of the model 11 and in front of the screen 10 so as to photograph both a desired portion of the model 11, the actor 13, and the background scene projected on the screen 10. A synchronous drive for the camera 14 and the projector (not shown) is of course provided. This may be accomplished through any suitable electrical or mechanical coupling as is well known in the art.

During the photographic operation, the model 11 is moved in a manner hereinafter described to simulate the natural movement of an airplane while in flight and is also moved in such a manner as to harmoniously correspond with the projected background scene on screen 10.

The support 12 is so constructed as to support the model 11 for movement about substantially the same axes as a real airplane would move under natural flight conditions, that is, when banking, tilting and turning.

However, since it is usually desirable to effect as small a movement as possible of the main center of interest of the scene, namely, the actor 13, a compromise is made by moving the model 11 about such axes as to cause only a relatively small movement of the actor 13 relative to the optical axis of the camera. Thus instead of pivoting the model about a vertical axis passing through the propeller to simulate turning, the model is pivoted about an axis a short distance in front of the actor 13.

Although the axes about which the model 11 and actor 13 are to be moved may be chosen as desired and the model 11 positioned on the support 12 accordingly, it has been found preferable to so arrange the mount 11 on the support 12 as to cause the same to be banked about the axis of the propeller 15 therefor or, in other words, about the longitudinal axis of the model, this being substantially the same as the axis about which a real airplane would normally bank if the rudder were not used. The position of the vertical axis about which the model 11 is to turn is preferably arranged approximately two feet in front of the actor 13 so as to cause a slight swinging motion of actor 13 when the model 11 is turned.

For tilting, the model 11 is moved about a horizontal axis approximately five feet below the banking axis thereof and intersecting the turning axis thereof. Since the actor 13 is to the rear of the tilting axis, the actor will be slightly raised when the model 11 is tilted to assume a diving position thus following approximately the same movement which would occur in an actual airplane when tilted into diving position.

The support 12 comprises a rectangular frame 16 normally adapted to be supported from the floor by swivelled wheels 17 whereby the support may be wheeled into and out of position. However, during actual photographing, the frame 16 is preferably supported on suitable blocks 18 to provide a rigid support.

A pair of spaced trusses 19 and 20 extend upwardly from the opposite sides of the form 16 and have mounted thereon trunnion supports generally indicated at 21 and 22, respectively. A curved bridge or track member 23 extends between the trusses 19 and 20 and is pivotally supported by the trunnion supports 21 and 22 for movement about a horizontal axis.

Figure 2:
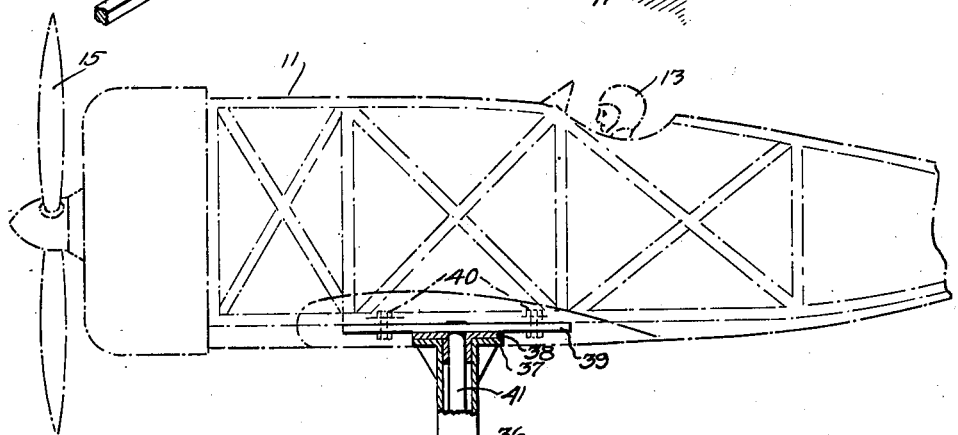
Fig. 2 is a side elevational view, with parts in section, of the support embodying the present invention.

The trunnion supports 21 and 22 are identical with each other and therefore only one will be described in detail. As shown in Figs. 1, 2 and 3, trunnion support 22 comprises a hollow axle 24 integrally formed on and extending outwardly from a plate 25 which is secured to one end of the member 23 by bolts 26. Axle 24 is journalled in a split bearing block 27, the lower half of which is secured by bolts 28 on top of the truss 20. The upper half of bearing block 27 is removably secured to the lower half in a suitable manner.

Axle 24 has a flange 29 extending radially therefrom at the outer end thereof and forms a bearing for a flanged member 30. A bracket 31 extending from the member 30 has rotatably mounted thereon a cable pulley 32, the periphery of which is substantially in alignment with the passage through the axle 24. This arrangement permits the member 30 and pulley 32 to be moved about the axis of the axle 24 and in practice permits the pulley 32 to assume the position illustrated regardless of the tilt of the member 23 about the axes of the trunnion supports 21 and 22.

As shown in Fig. 4 the bridge member 23 is square in cross section and has upper and lower tracks 33 and 33', respectively, thereon formed along each edge thereof for guiding a carriage generally indicated at 34 therealong. The upper and lower tracks 33 and 33', respectively, are both concentric about an axis passing through the longitudinal axis of the model 11, namely, the axis of the propeller 15.

The carriage 34 is constructed of structural members completely surrounding the bridge member 23. The top of carriage 34 forms a platform 35 having integrally formed thereon a vertically extending hollow pedestal 36. The upper end of pedestal 36 is flanged as at 37 (Fig. 2) to form a thrust bearing engaged by a mating bearing 38 suitably secured to a platform 39. Bearing 38 is also journalled in the pedestal 36. Platform 39 is secured as by bolts 40 to the framework of model 11 for supporting and holding the same.

A shaft 41 secured at the upper end thereof to the platform 39 extends through the bearing 38 and hollow pedestal 36 and is journalled in a bearing 42 fitted in pedestal 36 at the lower end thereof, thus forming a pivotal support for the model 11 whereby the same may be moved about an axis extending radial of the member 23.

A series of guide rollers 43 journalled on horizontally extending shafts 44 mounted in bosses formed on the depending structural members 46 of the carriage 34, engage the upper and lower surfaces of the tracks 33 and 33' on opposite sides of the member 23 to guide the carriage 34 therealong in an arcuate path.

A series of guide rollers 48, similar to those of 43, are rotatably journalled on vertically extending shafts 49 mounted on the cross members 50 of carriage 34 and engage the sides of the tracks 33 and 34 on opposite sides of the member 23 to guide the carriage 34 against transverse movement.

The platform 39 and model 11 are turned to simulate turning of an airplane, by means of an operator (not shown) positioned on a seat 52 supported by means of a bracket 53 from one of the depending structural members 46 on the carriage 34. A hand wheel 55, rotatable by the operator, is fixed on the end of a shaft 56 (Fig. 5)

journalled in bearings 57, 58 and 59 formed on brackets depending in a suitable manner from the platform 35 of carriage 34. A worm 60 secured on shaft 56 intermediate bearings 58 and 59 meshes with a worm gear 60' affixed to the lower end of the vertical shaft 41. Thus, rotation of the handwheel 55 by the operator carried on the carriage 34 causes the model 11 to turn about an axis radial of the bridge member 23, regardless of the position of carriage 34 along member 23.

The model 11 is banked or moved about the longitudinal axis thereof by movement of the carriage 34 along the member 23 under manual operation by cables 61 and 62. Cables 61 and 62 are suitably attached at 85 on either side of a transversely extending beam 63 forming part of the carriage 34.

Cable 62 is guided over the peripheries of a series of guide rollers 63' arranged in a path concentric with the bridge or track member 23 and rotatably supported between angle members 65 (Fig. 4) suitably formed and supported on the member 23. After passing over the roller 63' the cable 62 passes around a pulley 66 also rotatably supported by the angle members 65 and thence over a second pulley 67 rotatably supported by a bracket 68 projecting inwardly from the end of the member 23. The periphery of pulley 67 is substantially aligned with the passage through the hollow axle 24 whereby the cable 62 may be guided axially through axle 24 and over the pulley 32. From pulley 32 cable 62 is guided over lower pulleys 69 and 70 rotatably supported on brackets extending from the frame 16. Cable 62 is thence guided around a pulley 71 and is secured around the periphery of a semicircular capstan 72 (Fig. 1).

Capstan 72 has the hub 73 thereof rotatably mounted on a vertical axle 74 extending from a pedestal 75. A handle 76 extending from the capstan 72 permits an operator to manually move the capstan about the axle 74 to move the cables 61 and 62 in opposite directions. The cable 61 is guided in a manner identical with that of 62 over a series of rollers 77 arranged in a path concentric with the member 23, thence over pulleys 77 and 78, axially through the hollow trunnion support 21, over pulleys 79, 80, 81, 82 and 83. The end of cable 61 is also secured on the periphery of the capstan 72 but on the side thereof opposite that on which the cable 72 is secured. Thus, when the handle 76 is manually moved about the shaft 74 the cables 61 and 62 will act to draw the carriage 34 in the desired direction along the tracks 33 and 33' of the bridge member 23, the cross beam 63 passing under the rollers 63' and 77. The rollers 63' and 77 cause the cables 61 and 62, respectively, to follow an arcuate path concentric with the tracks 33 and 33' and thereby permit the carriage 34 to exert an even drag on the cables 61 and 62 while preventing any slack from being introduced into the cables due to the movement of the carriage 34 into different positions.

A structural beam 84 (Figs. 1 and 2) is secured by bolts 85 to one end of the bridge member 23 whereby the member 23 may be manually rocked about the trunnion supports 21 and 22 to tilt the model 11.

I claim:

1. An object support comprising the combination of a bridge member, means pivotally supporting said member for movement about an axis, means on said member forming a curved track concentric about an axis at right angles to said first mentioned axis, and a carriage movable along said track and adapted to support an object.

2. An object support comprising the combination of a bridge member, means pivotally supporting said member for movement about an axis, means on said member forming a curved track concentric about an axis at right angles to said first mentioned axis, a carriage movable along said track, an object supporting member, and means on said carriage supporting said last mentioned member for movement about an axis substantially at right angles to each of said first mentioned axes.

3. An object support comprising the combination of a bridge member, spaced trunnions extending from said member, means for pivotally supporting said trunnions, means on said member forming an arcuate track concentric about an axis at right angles to the axes of said trunnions, a carriage movable along said track, an object supporting shaft, and bearing means on said carriage supporting said shaft for movement about an axis at right angles to the axis about which said carriage is movable.

4. An object support comprising the combination of a bridge member, spaced hollow trunnions extending from said member, means pivotally supporting said trunnions, means on said member forming a curved track, a carriage movable along said track and adapted to support an object, and cable means extending through said trunnions for moving said carriage along said track.

5. An object support comprising the combination of a bridge member, means pivotally supporting said member, means forming an arcuate track on said member concentric about an axis extending at right angles to the pivotal axis of said member, and a carriage movable along said track and adapted to support an object in a position wherein said first mentioned axis extends through said object.

6. An object support comprising the combination of a bridge member, means pivotally supporting said member, means forming an arcuate track on said member concentric about an axis extending at right angles to the pivotal axis of said member, a carriage movable along said track, and means on said carriage adapted to pivotally support an object for movement about an axis radial of said track.

7. Apparatus for banking a full size airplane or model thereof to simulate actual flight conditions comprising the combination of a carriage for an airplane, an arcuate track member for supporting said carriage and having the center of curvature thereof substantially coincident with the axis of the propeller shaft of said airplane, and means for moving said carriage along said track member to bank said airplane about said axis of said propeller shaft.

8. Apparatus for moving a model airplane having a cockpit on top thereof to simulate actual flight conditions comprising means for moving said model about the longitudinal axis thereof for banking, means for moving said model about an axis lying in a plane at right angles to said longitudinal axis and extending below the apparent center of lift of said model for tilting, and means for moving said model about a substantially vertical turning axis through said center of lift, all of said means being positioned and arranged below said model.

9. Apparatus for moving a model airplane having a cockpit on top thereof to simulate actual flight conditions comprising a holder for said model, means for moving said holder to move said model about the longitudinal axis thereof for banking, means for moving said holder to move said model about an axis lying in a plane at right angles to said longitudinal axis and extending below the apparent center of lift of said model for tilting, and means for moving said holder to move said model about a substantially vertical turning axis through said center of lift.

10. Apparatus for moving an object about a plurality of axes comprising the combination of a bridge member, spaced coaxial hollow trunnions extending from said bridge member, supports for said trunnions means on said member forming a curved track, a carriage movable along said track and adapted to support an object, cables passing through said trunnions and attached to said carriage for moving said carriage along said track, roller means for guiding said cables axially through said trunnions, and means whereby said member may be moved about the axes of said trunnions.

11. Apparatus for moving an object about a plurality of axes comprising the combination of a member having a curved track thereon substantially concentric about an axis, trunnions on opposite sides of said member, bearings for supporting said trunnions for movement of said member about a horizontal axis substantially at right angles to said first mentioned axis, a carriage movable along said track and adapted to support an object, a pair of cables attached to said carriage and extending from opposite sides thereof for moving said carriage along said track, and means guiding said cables through said trunnions and axially thereof.

12. Apparatus for moving an object about a plurality of axes comprising the combination of a member having an arcuate track thereon, trunnions on said member, spaced trunnion supports for said trunnions for supporting said member for movement about a horizontal axis, a carriage movable along said track, a pedestal on said carriage, a platform on said pedestal, said platform being arranged at such a height that the center of gyration of an object on the platform coincides substantially with the center of curvature of said track, means for moving said carriage along said track, and means for pivoting said member on said trunnion supports.

13. Apparatus according to claim 12 comprising means on said carriage for rotating said platform about an axis radial of said track.

JAMES A. GIBBONS.